United States Patent Office 2,822,361
Patented Feb. 4, 1958

2,822,361

RIBOFLAVIN RECOVERY

Alpha L. Morehouse, Muscatine, Iowa, assignor to Grain Processing Corporation, Muscatine, Iowa, a corporation of Iowa No Drawing. Application June 22, 1954
Serial No. 438,634

5 Claims. (Cl. 260—211.3)

This invention relates to riboflavin recovery and has for an object the provision of a process for recovering riboflavin from fermentation broths.

A further object of this invention is the provision of a commercially feasible process by which riboflavin may be recovered from fermentation broths in good yields.

A further object of this invention is the provision of a riboflavin recovery process which may be readily and inexpensively carried out and which is adaptable to large scale operations.

Further and additional objects will appear from the following description and the appended claims.

In accordance with one embodiment of this invention, a process has been devised for recovering riboflavin from a fermentation broth containing the cells of a riboflavin-producing microorganism, riboflavin, and certain impurities, which process comprises the steps of separating the cells of the microorganism from the broth, adding a water-soluble riboflavin-reducing agent to the resulting beer at a pH below about 7.5 whereby to form a reduced riboflavin precipitate, separating the precipitate from the bulk of the beer, treating the precipitate with an alkali to form an aqueous dispersion having a pH above about 9.5 whereby the reduced riboflavin is solubilized, oxidizing the solubilized reduced riboflavin in the alkaline solution and thereafter acidifying the oxidized solution to a pH below about 8.0 whereby the riboflavin is precipitated in concentrated form.

The process is particularly useful in the recovery of riboflavin from fermentation broths or mashes that are formed by the elaboration of a riboflavin-producing microorganism, such as *Eremothecium ashbyii* or *Ashbya gossypii*. In accordance with a preferred embodiment of this invention, a freshly fermented broth or mash containing the elaboration products of the microorganism and normally having a pH between about 7.0 and 8.0 is acidified with a suitable acid such as sulfuric acid to lower the pH of the broth to below about 7.0 and preferably between about 4.5 and 5.0. The acidified mash is then heated to an elevated temperature in order partially to autolyze the cells of the microorganism and to extract the riboflavin therefrom. Thereafter the mash is cooled and the cells of the microorganism are separated from the beer by any suitable means, such as by filtering, centrifuging, settling or decanting. The resulting beer is treated with a water-soluble riboflavin-reducing compound whereby to precipitate reduced riboflavin. Such compounds are well known to the art and include sodium hydrosulfite, chromous sulfate, chromous chloride, hypovanadous sulfate, hypovanadous chloride, titanium trichloride, stannous chloride, and the like. The precipitation of the reduced riboflavin is effected while the pH of the beer is maintained below about 7.5 and preferably below about 6.0. After the reduced riboflavin has substantially completely precipitated upon standing, the bulk of the beer is separated by decanting, filtering, centrifuging or otherwise, and the reduced riboflavin-containing precipitate is separately treated with sufficient alkali to form a dispersion having a pH greater than about 9.5 and preferably between about 10 and 12. I have found that at this high pH (i. e. above pH 9.5) the reduced riboflavin, presumably in the form of a salt, is soluble in water. The alkaline aqueous solution of riboflavin which preferably has a pH between about 10 and 12 is then treated with an oxidizing agent, such as gaseous oxygen or air, in order to convert the reduced riboflavin to the oxidized form which is also soluble in the highly alkaline aqueous solution. Thereafter any solid impurities remaining in the alkaline dispersion are separated by filtering, decanting, centrifuging or otherwise, and the mother liquor is treated with an acid in order to lower the pH to below about 8.0, preferably between 4.0 and 7.5. This acid treatment causes precipitation of the riboflavin which is then separated from the mother liquor by filtration or other suitable means. If desired, this crude riboflavin precipitate may be further purified by recrystallization from hot water or by other methods known to the art.

For a more complete understanding of this invention, reference will now be made to a specific example indicating the manner in which the process of this invention may be carried out.

*Example*

Approximately 12,000 gallons of a whole fresh fermentation broth resulting from the elaboration of *Ashbya gossypii* in a fermentation medium of the character disclosed and claimed in Malzahn and Hanson application Serial No. 371,156, filed July 29, 1953, and containing a total of about 50,000 grams of riboflavin were acidified with sulfuric acid to a pH of 4.5 and then heated to about 212° F. for about 30 minutes. The hot liquid (11,600 gallons) was transferred to a holding tank and 1500 pounds of a filter aid (Filter-Cel) were added. The resulting mixture was agitated continuously and filtered hot through a leaf type filter to remove the mold mycelium. The filter cake was washed with water and blown with air whereby most of the riboflavin was removed from the filter cake.

The combined filtrate and washings measured 12,080 gallons and contained about 91.4 percent of the total riboflavin initially present in the broth or about 45,720 grams. The temperature of the beer was lowered by means of agitation and cooling coils in the tank to about 100° F. whereafter about 380 pounds of sodium hydrosulfite were added and thoroughly admixed. The liquid in the tank was blanketed with carbon dioxide gas in order to prevent access to atmospheric oxygen and allowed to stand without agitation for a period of 18 hours. Under these conditions most of the riboflavin in the precipitated reduced form settled to the bottom of the tank. The supernatant liquid, assaying about 63 mcgm. per ml., was removed by decanting and discarded. The precipitate of reduced riboflavin was slurried up in a small amount of cold water and thereafter sufficient sodium hydroxide was added to the slurry in order to dissolve all of the precipitate and simultaneously to raise the pH of the dispersion to about 11.0. The alkaline solution of the reduced riboflavin was then transferred to another tank for oxidation. At this point the alkaline solution of reduced riboflavin measured 503 gallons and contained an equivalent of 42,000 grams of riboflavin.

This alkaline solution was then oxidized by passing small bubbles of gaseous oxygen in the form of air through the solution and agitating for about 30 minutes. The solution still having a pH of about 11 and containing the riboflavin (presumably as a salt) in the oxidized or nonreduced soluble form was filtered through a filter press in order to remove certain solid impurities. The filtrate was then acidified with sulfuric acid to about pH 6.5 resulting in the crystallization of the riboflavin. After crystallization was complete the precipitate was filtered off and dried at 200° F. The dry precipitate obtained as the final product weighed 45,500 grams and assayed 87 percent riboflavin. The over-all recovery of riboflavin obtained was 95 percent with a conversion to crude crystalline product of 79 percent.

Thus it will be apparent that a simple and inexpensive method has been provided for recovering riboflavin from fermentation broths or mashes. The recovery process is dependent at least in part upon my discovery that alkali salts of reduced and oxidized riboflavin are both readily soluble in aqueous solution at above about pH 9.5 (preferably between pH 10.0 to 12.0), while both the reduced and oxidized forms of riboflavin are readily precipitatable therefrom by lowering the pH to below about pH 8.0 (preferably between 4.0 and 7.5). Thus, by this process, riboflavin is readily recovered in high percentage yields from fermentation broths containing it and this recovery involves only the simple steps of pH adjustment in combination with conventional reduction and oxidation steps. No special solvents are required.

While sulfuric acid and sodium hydroxide have been specified as the substances for adjusting the hydrogen ion concentrations of the several solutions, it will be apparent that other acids and alkalies may be employed to raise or lower the pH to the indicated values as may be required in accordance with the broad aspects of this invention. For example, in place of sulfuric acid could be used such acids as hydrochloric, phosphoric, lactic or acetic acids. In place of sodium hydroxide as an alkalizing agent may be used potassium hydroxide, sodium carbonate, ammonium hydroxide, and the like.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. In a process of recovering riboflavin from a fermentation beer essentially free of microbial cells but containing riboflavin and impurities in solution, the steps of reducing the riboflavin therein contained at a pH below about 7.5 to precipitate reduced riboflavin contaminated with certain impurities, separating the mother liquor having a low riboflavin content, treating the reduced riboflavin precipitate with an alkali in aqueous solution whereby to raise the pH above about 9.5 and to dissolve the reduced riboflavin in said precipitate, oxidizing the resulting alkaline solution with gaseous oxygen to convert the reduced solubilized riboflavin to the soluble oxidized state, separating insoluble impurities from the resulting solution while maintaining the pH of the solution above about 9.5, and thereafter acidifying the solution to a pH below about 8.0 whereby a riboflavin concentrate is precipitated.

2. A process of recovering riboflavin from a fermentation broth containing cells of a riboflavin-producing microorganism, riboflavin in solution and impurities, which comprises separating said cells from said broth, adding a water-soluble riboflavin-reducing agent selected from the group consisting of hydrosulfites, chromous salts, hypovanadous salts, stannous salts, and trivalent titanium salts to the resulting beer at a pH below about 7.5 whereby to form a reduced riboflavin precipitate, separating the precipitate from the bulk of the beer, treating said precipitate with an alkali to form a dispersion having a pH above about 9.5 whereby said reduced riboflavin is solubilized, treating the resulting alkaline solution with gaseous oxygen whereby said reduced riboflavin is oxidized and remains soluble in said solution, separating solid impurities from said solution, and thereafter acidifying the solution to a pH below about 8.0 whereby said riboflavin is precipitated.

3. The process of claim 2 wherein the reducing step is carried out under substantially anaerobic conditions.

4. A process of recovering riboflavin from a fermentation broth containing cells of a riboflavin-producing microorganism, riboflavin in solution and impurities which comprises separating said cells from said broth, treating said broth with a sodium hydrosulfite reducing agent at a pH below about 7.5 whereby to form a reduced riboflavin precipitate, separating the precipitate from the bulk of the beer, treating said precipitate with an alkali to form a dispersion having a pH above about 9.5 whereby said reduced riboflavin is solubilized, treating the resulting alkaline solution with gaseous oxygen to oxidize and maintain soluble the riboflavin contained therein, separating solid impurities from said solution and thereafter acidifying the solution to a pH below about 8 whereby said riboflavin is precipitated.

5. The process of claim 4 wherein said reducing step is carried out under substantially anaerobic conditions.

References Cited in the file of this patent

UNITED STATES PATENTS

| | | |
|---|---|---|
| 2,367,644 | Hines | Jan. 16, 1945 |
| 2,367,646 | McMillan | Jan. 16, 1945 |